(12) United States Patent
Kazeto

(10) Patent No.: US 7,754,331 B2
(45) Date of Patent: Jul. 13, 2010

(54) ETHYLENE-VINYL ALCOHOL COPOLYMER COMPOSITION, AND POWDERY COATING COMPOSITION COMPRISING IT

(75) Inventor: Osamu Kazeto, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 12/503,182

(22) Filed: Jul. 15, 2009

(65) Prior Publication Data

US 2009/0274917 A1   Nov. 5, 2009

Related U.S. Application Data

(63) Continuation of application No. 11/334,574, filed on Jan. 19, 2006, now abandoned, which is a continuation of application No. 10/962,604, filed on Oct. 13, 2004, now abandoned, which is a continuation of application No. 10/232,327, filed on Sep. 3, 2002, now abandoned.

(30) Foreign Application Priority Data

Sep. 3, 2001 (JP) .............................. 2001-265944

(51) Int. Cl.
| | |
|---|---|
| B32B 5/16 | (2006.01) |
| C08K 3/22 | (2006.01) |
| C08K 3/36 | (2006.01) |
| B32B 15/082 | (2006.01) |

(52) U.S. Cl. ...................... 428/407; 428/403; 428/404; 524/430; 524/437; 524/492; 524/493; 524/556; 524/557

(58) Field of Classification Search .................. 428/323, 428/329, 330, 331, 463, 522, 403, 404, 407; 524/492, 904, 430, 437, 493, 556, 557
See application file for complete search history.

(56) References Cited

U.S. PATENT DOCUMENTS

| | | | |
|---|---|---|---|
| 3,415,771 A | 12/1968 | Woodruff | 524/379 |
| 4,119,687 A | 10/1978 | Resz et al. | 264/9 |
| 4,774,137 A | 9/1988 | Alberts et al. | 428/407 |
| 5,194,474 A | 3/1993 | Aoyama et al. | 524/300 |
| 5,260,371 A | 11/1993 | Chen | 525/60 |
| 6,228,927 B1 | 5/2001 | Lucarelli et al. | 524/493 |
| 6,242,087 B1 | 6/2001 | Kawai | 428/336 |
| 6,432,552 B1 | 8/2002 | Onishi | 428/522 |

FOREIGN PATENT DOCUMENTS

| | | |
|---|---|---|
| EP | 0 123 927 | 11/1984 |
| EP | 1 067 152 | 1/2001 |

OTHER PUBLICATIONS

Patent Abstracts of Japan, JP 9-241537, Sep. 16, 1997.

*Primary Examiner*—D. S Nakarani
(74) *Attorney, Agent, or Firm*—Oblon, Spivak, McClelland, Maier & Neustadt, L.L.P.

(57) ABSTRACT

An ethylene-vinyl alcohol copolymer (EVOH) composition comprises 100 parts by weight of a powder (A) having a particle size of from 22 to 850 μm of an ethylene-vinyl alcohol copolymer (a) which has an ethylene content of from 2 to 60 mol % and has a degree of saponification greater than 95%, and from 0.0001 to 2 parts by weight of inorganic particles (B) having primary particles with a mean particle size of from 1 to 100 nm. The EVOH powder coating composition of the present invention forms a coating film having good uniformity when applied to a substrate as powder coating, even when it contains 1 part by weight or more water relative to 100 parts by weight of EVOH resin.

17 Claims, No Drawings

US 7,754,331 B2

ETHYLENE-VINYL ALCOHOL COPOLYMER COMPOSITION, AND POWDERY COATING COMPOSITION COMPRISING IT

This is a continuation Application of U.S. patent application Ser. No. 11/334,574 filed on Jan. 19, 2006, now abandoned, which is a Continuation of U.S. patent application Ser. No. 10/962,604 filed on Oct. 13, 2004, now abandoned, which is a Continuation of U.S. patent application Ser. No. 10/232,327 filed on Sep. 03, 2002, now abandoned, and claims priority to Japanese Application 2001/265944 filed on September 03, 2001.

BACKGROUND OF THE INVENTION

1. Field of the Invention

The present invention relates to an ethylene-vinyl alcohol copolymer composition that comprises a powder of an ethylene-vinyl alcohol copolymer and inorganic particles, and to a powder coating composition comprising the ethylene-vinyl alcohol copolymer composition. The invention also relates to a method for producing such an ethylene-vinyl alcohol copolymer composition.

2. Discussion of the Background

Polyethylene, polyamide or epoxy resin powders have been used as resins for powder coatings to prevent metals or metal substrates from becoming corroded, and to protect metals from exposure to solvents. In particular, it is desirable to minimize the use of solvent-type coating compositions in order to reduce the load of solvents in the environment. Consequently, powder coating compositions are considered to be useful in increasing productivity and reducing costs.

However, acrylic, epoxy, polyamide or polyethylene resin powders are principally used as powder coating resins for preventing metals from becoming rusted or corroded. Since the gas-barrier properties and/or the chemical resistance of these resins are insufficient, films prepared from conventional resins must be very thick. In addition, since the interlayer adhesion of the resin film coating to the surface of metal is insufficient, the metal surface must be pre-treated with a primer or the like before being coated.

To solve these problems, Japanese Patent Laid-Open No. 115472/1991 discloses a method of using an ethylene-vinyl alcohol copolymer (hereinafter abbreviated as EVOH) powder for a powder coating resin.

In addition, Japanese Patent Laid-Open No. 241537/1997 discloses a powder coating resin composition that comprises 100 parts by weight of a saponified ethylene-vinyl acetate copolymer having an ethylene content of from 15 to 70 mol % and a degree of saponification of the vinyl acetate component of at least 80 mol % and having a melt index of from 1 to 100 g/10 min, from 0.0001 to 1 part by weight of an acid compound, and from 0.1 to 1 part by weight of a low-boiling-point compound having a boiling point of not higher than 200° C. This improves the uniformity of the thickness of the resin-coating layer of articles coated with the EVOH powder and improves the impact resistance of the surface of the coating layer. Japanese Patent Laid-Open No. 241537/1997 indicates that water is a preferred low-boiling point compound having a boiling point of not higher than 200° C., because it is safe and has a low environmental impact. Furthermore, when the amount of the low-boiling point compound having a boiling point of not higher than 200° C. in the composition is greater than 1 part by weight, and when the composition is applied to substrates by means of a flame spray coating process, in which a rapid temperature increase is inevitable, then the surface of the coating layer formed is greatly roughened.

However, EVOH is a polymer of high hydrophilicity and it absorbs water. In particular, compared with ordinary commercially available EVOH pellets, EVOH powder having a particle size less than 850 µm has a large surface area per the unit volume, and therefore it absorbs water readily. (EVOH powder having a particle size of less than 850 µm referred to herein is an EVOH powder that contains at least 80% by weight of particles capable of passing through a sieve having a nominal size of 850 µm as stipulated in JIS Z-8801.)

Therefore, when an EVOH powder having such a small particle size is left in an open space for a long period of time, it will absorb ambient water, and may contain at least 1 part by weight (for example, from 1 to 3 parts by weight or so) of water relative to 100 parts by weight of EVOH. Accordingly, if an EVOH powder which has been left exposed to ambient moisture for a long period of time is used for powder coating compositions, the powder is preferably dried before use.

However, drying the EVOH powder involves additional cost and is troublesome. In particular, when only a small amount of EVOH powder is needed, the EVOH powder must be repeatedly dried whenever it is used, which will cause thermal degradation of the EVOH powder. In addition, when conventional EVOH powder is used for coating substrates continuously over a long period of time in high-humidity conditions, the water content of the EVOH powder gradually increases, and, as a result, the uniformity of the coating film formed is often poor (that is, the coating film becomes less smooth and glossy). Therefore, depending on the working environment (especially in high-humidity conditions), it is not always easy to continuously coat substrates with a coating composition containing EVOH powder, over a long period of time. Thus, it is desirable to develop a powder coating method in which a powder composition comprising even an EVOH powder that contains one or more parts by weight of water relative to 100 parts by weight of EVOH, can form coatings having high uniformity.

SUMMARY OF THE INVENTION

The problems discussed above can be solved by an ethylene-vinyl alcohol copolymer composition that comprises 100 parts by weight of a powder (A), having a particle size of from 22 to 850 µm, of an ethylene-vinyl alcohol copolymer (a) (hereinafter, EVOH (a)) which has an ethylene content of from 2 to 60 mol % and has a degree of saponification of higher than 95%, and from 0.0001 to 2 parts by weight of inorganic particles (B) of which the primary particles have a mean particle size of from 1 to 100 nm. In a preferred embodiment of the composition, the inorganic particles (B) adhere to the surface of the powder (A).

In a second preferred embodiment of the composition of the present invention, the EVOH (a) contains from 10 to 5000 ppm of a carboxylic acid. In a more preferred embodiment thereof, the carboxylic acid is at least one selected from a group consisting of acetic acid, propionic acid and lactic acid.

In a third embodiment of the composition of the present invention, the EVOH (a) contains from 5 to 500 ppm of an alkali metal salt (expressed as ppm by weight of the elemental alkali metal, relative to the weight of the EVOH (a)). In still another embodiment thereof, the EVOH (a) contains from 10 to 5000 ppm of a carboxylic acid and from 5 to 500 ppm of an alkali metal salt, and the ratio by weight of the carboxylic acid to the alkali metal salt (i.e., the weight of the carboxylic acid divided by the weight of the alkali metal in the EVOH (a)) falls between 0.1 and 15.

In a fourth embodiment of the composition of the present invention, the EVOH (a) contains from 5 to 250 ppm of an alkaline earth metal salt (expressed as ppm by weight of the elemental alkaline earth metal, relative to the weight of the EVOH (a)). In still another embodiment thereof, the EVOH (a) contains from 10 to 5000 ppm of a carboxylic acid and from 5 to 250 ppm of an alkaline earth metal salt, and the weight ratio of the carboxylic acid to the alkaline earth metal salt (i.e., the weight of the carboxylic acid divided by the weight of the alkaline earth metal in the EVOH (a)) falls between 0.2 and 15.

In a fifth embodiment of the composition of the present invention, the EVOH (a) contains from 1 to 300 ppm of a phosphate compound (expressed as ppm by weight of phosphate groups, relative to the weight of the EVOH (a); i.e., the total amount of $PO_4^{3-}$, $HPO_4^{2-}$, and $H_2PO_4^-$, measured by ion chromatography analysis of the EVOH, as discussed below).

In a sixth embodiment of the composition of the present invention, the EVOH (a) is modified with a silicon-containing olefinic unsaturated monomer, and the degree of modification of the copolymer with the silicon-containing olefinic unsaturated monomer falls between 0.0002 and 0.5 mol %.

In a seventh embodiment of the composition of the present invention, the inorganic particles (B) comprise silica and/or aluminum oxide. In still another embodiment thereof, the inorganic particles (B) have hydrophobic surfaces.

The EVOH composition of the present invention may be used for powder coating compositions. The powder coating composition may also be applied to substrates to give multilayer structures. In a more preferred embodiment of the multilayer structures, the substrate is a metal.

DETAILED DESCRIPTION OF THE INVENTION

The EVOH composition of the present invention is preferably prepared by dry-blending 100 parts by weight of a powder (A) having a particle size of from 22 to 850 μm, and which comprises an EVOH (a) that has an ethylene content of from 2 to 60 mol % and has a degree of saponification of higher than 95%, with from 0.0001 to 2 parts by weight of inorganic particles (B), wherein the primary particles have a mean particle size of from 1 to 100 nm.

The EVOH composition of the present invention may also be prepared by dry-blending 100 parts by weight of an EVOH (a) that has an ethylene content of from 2 to 60 mol % and has a degree of saponification of higher than 95%, with from 0.0001 to 2 parts by weight of inorganic particles (B), wherein the primary particles have a mean particle size of from 1 to 100 nm, followed by grinding the resulting mixture.

Preferably, the EVOH (a) of the present invention is prepared by saponifying an ethylene-vinyl ester copolymer. Ethylene-vinyl acetate copolymers are preferred as ethylene-vinyl ester copolymers because the raw materials are inexpensive and readily available. The ethylene content of the EVOH (a) of the present invention falls between 2 and 60 mol %. If the EVOH has an ethylene content greater than 60 mol %, the resulting coating does not have acceptable gas-barrier properties and good chemical resistance. The uppermost limit of the ethylene content of the EVOH (a) is 60 mol %, preferably at most 57 mol %, more preferably at most 54 mol %, most preferably at most 51 mol %. On the other hand, if an EVOH having an ethylene content of less than 2 mol % is used in the EVOH powder coating composition of the present invention, the resulting coating film is too hard, and its impact resistance is poor. In addition, EVOH having a lower ethylene content has a higher melting point, and its decomposition point therefore tends to be lower. Therefore, if EVOH having such a low ethylene content is used in the EVOH powder coating composition of the present invention, the processing latitude in coating substrates with the powder coating of the present invention will be narrow. The lowermost limit of the ethylene content of the EVOH (a) is 2 mol %, preferably at least 5 mol %, more preferably at least 10 mol %, even more preferably at least 15 ml %, most preferably at least 20 mol %.

The degree of saponification of the EVOH (a) of the present invention must be higher than 95% (i.e., more than 95 mol % of the ester groups of the precursor ethylene-vinyl ester copolymer have been hydrolyzed). Powder coatings prepared from EVOH having a degree of saponification of 95% or less do not provide satisfactory gas-barrier properties and good chemical resistance. Thus, in order to provide good gas-barrier properties and chemical resistance, the degree of saponification of the EVOH (a) is at least 95%, preferably at least 96%, more preferably at least 97%, even more preferably at least 98%, still more preferably at least 99%.

Preferably, the MFR (melt flow rate; measured at 190° C., 2160 g load) of the EVOH (a) of the present invention falls between 3 and 150 g/10 min. if an EVOH having an MFR of less than 3 g/10 min is used in the EVOH powder coating composition of the present invention, the resin has poor flow properties, and the surface of the coating film formed thereby will be rough. On the other hand, if an EVOH having an MFR greater than 150 g/10 min is used, the thickness of the coating film formed will be uneven. More preferably, the MFR of the EVOH (a) falls between 5 and 120 g/10 min, even more preferably between 8 and 90 g/10 min, still more preferably between 10 and 60 g/10 min (all MFR values measured at 190° C., 2160 g load). If the glossiness of the coating film formed from the powder coating composition of the present invention is a matter of great importance, the MFR (190° C., 2160 g load) of the EVOH (a) preferably falls between 15 and 60 g/10 min, most preferably between 20 and 60 g/10 min.

As discussed above, the vinyl ester monomer copolymerized with ethylene is preferably vinyl acetate. However, the vinyl acetate may be copolymerized with any other vinyl ester of a fatty acid (e.g., vinyl propionate, vinyl pivalate, etc.).

If desired, the ethylene and vinyl ester monomers may be copolymerized with a small amount of any other monomer capable of copolymerizing with them. For example, such comonomers may include propylene, isobutylene; α-olefins such as 1-octene, 1-dodecene; unsaturated acids such as acrylic acid, methacrylic acid, crotonic acid, maleic acid, itaconic acid, and their anhydrides, salts, and mono- or di-alkyl esters; nitriles such as acrylonitrile, methacrylonitrile; amides such as acrylamide, methacrylamide; olefinsulfonic acids such as ethylenesulfonic acid, allylsulfonic acid, methallylsulfonic acid, and their salts; and alkyl vinyl ethers, vinyl ketones, N-vinylpyrrolidone, vinyl chloride, vinylidene chloride.

Preferably, the EVOH (a) of the present invention is modified with a silicon-containing olefinic unsaturated monomer and the degree of modification thereof with the monomer falls between 0.0002 and 0.5 mol %. When the powder coating composition comprising the modified EVOH is applied onto substrates, the interlayer adhesion between the coating film formed and the substrate is improved. In particular, the interlayer adhesion provided by the modified EVOH is more significantly improved when the composition is applied to metallic substrates. However, when the degree of modification of EVOH with the silicon-containing olefinic unsaturated monomer is less than 0.0002 mol %, the modified EVOH does not provide sufficiently improved interlayer adhesion between the coating film and the substrate. On the other hand, if the degree of modification of the modified EVOH is greater than 0.5 mol %, the melt flowability of the resin decreases, and the surface of the coating resin film formed thereby will be rougher. More preferably, the degree of modification of the EVOH (a) with the silicon-containing olefinic unsaturated monomer falls between 0.001 and 0.1 mol %, even more preferably between 0.005 and 0.07 mol %, most preferably between 0.01 and 0.05 mol %.

Preferably, the silicon-containing olefinic unsaturated monomer is one or more monomers selected from silicon-containing olefinic unsaturated monomers of the following general formulae (I), (II) and (III):

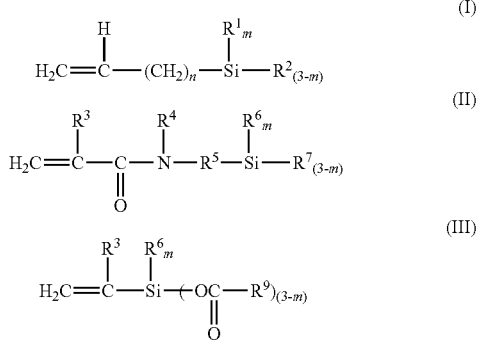

In these formulae, n is 0 or 1; m is an integer from 0-2, inclusive; $R^1$ represents a lower alkyl group having from 1 to 8 carbon atom, an allyl group, or an allyl-containing lower alkyl group having from 1 to 8 carbon atoms; $R^2$ represents an alkoxyl group having from 1 to 40 carbon atoms, which may have oxygen-containing substituent(s); $R^3$ represents a hydrogen atom or a methyl group; $R^4$ represents a hydrogen atom or a lower alkyl group having from 1 to 8 carbon atoms; $R^5$ represents an alkylene group, or a divalent organic residue with carbon chains bonded to each other via an oxygen or nitrogen atom; $R^6$ represents a hydrogen atom, a halogen atom, a lower alkyl group, an allyl group, or an allyl-containing lower alkyl group having from 1 to 8 carbon atoms; $R^7$ represents an alkoxyl group or an acyloxyl group, which may have oxygen or nitrogen-containing substituent(s); $R^8$ represents a hydrogen atom, a halogen atom, a lower alkyl group having from 1 to 8 carbon atoms, an allyl group, or an allyl-containing lower alkyl group having from 1 to 8 carbon atoms; and $R^9$ represents a lower alkyl group having from 1 to 8 carbon atoms.

Examples of the silicon-containing olefinic unsaturated monomers of formula (I) are vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allyldimethylethoxysilane, vinyltris(methoxyethoxy)silane, and vinylisobutyldimethoxysilane.

Examples of the silicon-containing olefinic unsaturated monomers of formula (II) are 3-(meth)acrylamidopropyltrimethoxysilane, 3-(meth)acrylamidopropyltriethoxysilane, 3-(meth)acrylamidopropyltri(-methoxyethoxy)silane, 3-(meth)acrylamidopropyltri(N-methylaminoethoxy)silane, 2-(meth)acrylamidoethyltrimethoxysilane, and 1-(meth)acrylamidomethyltrimethoxysilane.

Examples of the silicon-containing olefinic unsaturated monomers of formula (III) are vinyltriacetoxysilane, vinyltripropionyloxysilane, isopropenyltriacetoxysilane, vinylisobutyldiacetoxysilane, vinylmethyldiacetoxysilane, vinyldimethylacetoxysilane, vinylphenyldiacetoxysilane, vinylmonochlorodiacetoxysilane, and vinylmonohydrogendiacetoxysilane.

The preferred silicon-containing olefinic unsaturated monomers of the silicon-containing olefinic unsaturated monomers of formulae (I) to (III) are vinyltrimethoxysilane, vinyltriethoxysilane and vinyltri(methoxyethoxy)silane. Vinyltrimethoxysilane and vinyltriethoxysilane are especially preferred.

The method for preparing the EVOH modified with such silicon-containing olefinic unsaturated monomers is not specifically defined. Preferably, for example, the modified EVOH may be obtained by ternary copolymerization of ethylene and vinyl acetate with a small amount of a silicon-containing olefinic unsaturated monomer fed to the polymerization reactor; or by dissolving EVOH in a suitable solvent such as dimethyl sulfoxide followed by adding a silicon-containing olefinic unsaturated monomer thereto along with a suitable catalyst to thereby graft the EVOH with the silicon-containing olefinic unsaturated monomer; or by adding a silicon-containing olefinic unsaturated monomer and a suitable catalyst to EVOH via a plunger pump or the like while the EVOH is kneaded as a melt in a twin-screw extruder or the like to thereby graft the EVOH with the silicon-containing olefinic unsaturated monomer. Ternary copolymerization of ethylene and vinyl acetate with a small amount of a silicon-containing olefinic unsaturated monomer fed to the polymerization reactor is especially preferred, as it is an inexpensive method.

Preferably, the EVOH (a) of the present invention contains from 10 to 5000 ppm of a carboxylic acid. When the EVOH (a) contains a carboxylic acid in an amount falling within the above-defined range, powder coatings formed therefrom have a decreased tendency to thermally deteriorate during the coating process, and therefore the coating film has a decreased tendency to become yellowed. Preferably, the carboxylic acid has a pKa of at least 3.5 at 25° C. Carboxylic acids which have a pKa at 25° C. which is smaller than 3.5 are not acceptable because the pH of the EVOH (a) containing such a carboxylic acid tends to be difficult to control. In addition, EVOH powder compositions containing such a carboxylic acid tends to gel when applied to substrates, resulting in a coating film having an uneven thickness.

Examples of the carboxylic acid usable in the present invention are succinic acid, adipic acid, benzoic acid, caprylic acid, lauric acid, glycolic acid, lactic acid, formic acid, acetic acid and propionic acid. However, dicarboxylic acids such as succinic acid and adipic acid are not as good as monocarboxylic acids, since EVOH compositions containing such dicarboxylic acids will more readily gel, and provide a coating film having an uneven thickness. Thus, preferred carboxylic acids include acetic acid, propionic acid and lactic acid. Acetic acid and propionic acid are more preferred, since they are inexpensive and since their acidity level is such that the pH of the EVOH (a) that contains such a carboxylic acid is therefore easy to control.

If, however, the carboxylic acid content of the EVOH (a) is greater than 5000 ppm, the EVOH powder coating composition will tend to gel, and the thickness of the coating film formed therefrom will be uneven. Thus, the uppermost limit of the carboxylic acid content of the EVOH (a) is at most 5000 ppm, preferably at most 1000 ppm, more preferably at most 500 ppm. On the other hand, the lowermost limit of the carboxylic acid content is preferably at least 20 ppm, more preferably at least 30 ppm.

Also preferably, the EVOH (a) of the present invention contains from 5 to 500 ppm of an alkali metal salt (expressed as ppm by weight of the alkali metal, relative to the EVOH (a)). If the coating composition contains an amount alkali metal salt within the defined range, the interlayer adhesion between the coating film formed from the EVOH powder composition and the substrate coated with the film is improved. In particular, the improvement in the interlayer adhesion between the substrate and the film is significant when the coating composition is applied to metallic substrates.

In order to provide good interlayer adhesion between the EVOH coating film and the substrate, the lowermost limit of the alkali metal salt content of the EVOH (a) is preferably at least 10 ppm, more preferably at least 20 ppm, even more preferably at least 50 ppm (expressed as ppm by weight of the alkali metal, relative to the weight of the EVOH (a)). In order to prevent yellowing of the EVOH coating film, and to provide a coating with a good appearance, the uppermost limit of the alkali metal salt content of the EVOH (a) is preferably at most 400 ppm, more preferably at most 300 ppm.

The alkali metal may include, for example, lithium, sodium and potassium. For example, the alkali metal salt may be an aliphatic carboxylate, aromatic carboxylate, phosphate, or a metal complex of an alkali metal. Examples of alkali metal salts are sodium acetate, potassium acetate, sodium propionate, potassium propionate, sodium lactate, potassium lactate, sodium phosphate, lithium phosphate, sodium stearate, potassium stearate, and sodium salts of ethylenediaminetetraacetic acid. The preferred salts are sodium acetate, potassium acetate, sodium propionate, potassium propionate, sodium lactate and potassium lactate.

When the EVOH composition comprises an EVOH (a) which contains both a carboxylic acid and an alkali metal salt, the ratio by weight of the carboxylic acid to the alkali metal salt (i.e., the weight of the carboxylic acid divided by the weight of the alkali metal) preferably falls between 0.1 and 15. The lowermost limit of the ratio of carboxylic acid/alkali metal salt is preferably at least 0.2, more preferably at least 0.3. On the other hand, the uppermost limit of the ratio of carboxylic acid/alkali metal salt is preferably at most 12, more preferably at most 10.

Also preferably, the EVOH (a) of the present invention contains from 5 to 250 ppm of an alkaline earth metal salt (expressed as ppm by weight of the alkaline earth metal element, relative to the weight of the EVOH (a)). If the EVOH composition contains an amount of alkaline earth metal salt within the defined range, the interlayer adhesion between the coating film formed from the EVOH powder composition and the substrate is improved. In particular, the improvement in the interlayer adhesion between the coating film and the substrate is remarkable when the coating composition is applied to metallic substrates.

In order to provide satisfactory interlayer adhesion between the EVOH coating film and the substrate, the lowermost limit of the alkaline earth metal salt content of the EVOH (a) is preferably at least 10 ppm, more preferably at least 20 ppm, even more preferably at least 30 ppm. On the other hand, in order to prevent the EVOH coating film from becoming yellowed, and to provide a film having a good appearance, the uppermost limit of the alkaline earth metal salt content of the EVOH (a) is preferably at most 200 ppm, more preferably at most 150 ppm.

The alkaline earth metal may be for example, beryllium, magnesium, calcium and barium. The alkaline earth metal salt may be, for example, an aliphatic carboxylate, an aromatic carboxylate, a phosphate, or a metal complex of an alkaline earth metal. Examples of such alkaline earth metal salts are magnesium acetate, calcium acetate, magnesium propionate, calcium propionate, magnesium lactate, calcium lactate, magnesium stearate and calcium stearate. The more preferred salts are magnesium acetate, calcium acetate, magnesium propionate, calcium propionate, magnesium lactate and calcium lactate.

If the EVOH copolymer (a) contains both a carboxylic acid and an alkaline earth metal salt, the ratio by weight of the carboxylic acid to the alkaline earth metal salt (i.e., the weight of the carboxylic acid divided by the weight of the alkaline earth metal in the EVOH (a)) preferably falls between 0.2 and 15, in order to provide a suitable balance between preventing the yellowing of the coating film, and improving the adhesion of the coating film to the substrate. The lowermost limit of the ratio of carboxylic acid/alkaline earth metal salt is preferably at least 0.4, more preferably at least 0.8. On the other hand, the uppermost limit of the ratio of carboxylic acid/alkaline earth metal salt is preferably at most 12, more preferably at most 10.

The EVOH (a) may contain both an alkali metal salt and an alkaline earth metal salt. In this case, it is desirable that the total amount of the alkali metal salt and the alkaline earth metal salt added to the EVOH (a) falls between 10 and 400 ppm, expressed as the combined weight of the alkali and alkaline earth metals relative to the weight of the EVOH (a).

Also preferably, the EVOH (a) of the present invention contains from 1 to 300 ppm of a phosphate compound (expressed as ppm by weight of phosphate groups, relative to the weight of the EVOH (a)). The EVOH composition of the present invention, in which the EVOH (a) contains an amount of the phosphate compound within the defined range, inhibits thermal deterioration during the coating process and therefore effectively prevents yellowing of the coating film formed. However, if the phosphate compound content of the EVOH (a) is larger than 300 ppm, the EVOH powder composition will gel when it is applied onto a substrate, and the thickness of the coating film formed thereby will be uneven. Thus, the uppermost limit of the phosphate compound content of the EVOH (a) is preferably at most 250 ppm, more preferably at most 200 ppm. On the other hand, the lowermost limit of the phosphate compound content of the EVOH (a) is preferably at least 3 ppm, more preferably at least 5 ppm, even more preferably at least 10 ppm.

The type of the phosphate compound added to the EVOH (a) is not specifically defined. It may include various acids such as phosphoric acid, phosphorous acid, and their salts. Any phosphate of any type of primary phosphate, secondary phosphate and tertiary phosphate may be used, and the associated cation is not specifically defined. Alkali metal salts and alkaline earth metal salts are preferred. Phosphoric acid, sodium dihydrogenphosphate, potassium dihydrogenphosphate, disodium hydrogenphosphate and dipotassium hydrogenphosphate are especially preferred; and phosphoric acid, sodium dihydrogenphosphate and potassium dihydrogenphosphate are more especially preferred.

A boron compound may also be added to the EVOH (a). The boron compound may include, for example, boric acids, boric esters, borate salts and boron hydrides. Specifically, the boric acids may be orthoboric acid, metaboric acid and tetraboric acid; the boric esters may be triethyl borate and trimethyl borate; and the borate salts may be alkali metal salts and alkaline earth metal salts of various boric acids such as those mentioned above, and borax. Orthoboric acid is preferred. The amount of boron compound added to the EVOH (a) is preferably controlled so that the boron compound content of the EVOH (a) falls between 20 and 2000 ppm, more preferably between 50 and 1000 ppm, expressed as ppm by weight of boron, relative to the weight of the EVOH (a).

As mentioned above, the EVOH (a) of the composition of the present invention may optionally contain at least one additive component selected from a group consisting of carboxylic acids, alkali metal salts, alkaline earth metal salts, phosphate compounds and boron compounds. The method for preparing an EVOH (a) that contains any of such components is not specifically defined. Some preferred preparation methods are as follows: The EVOH (a) may be dipped in a solution of an additive component; or the EVOH (a) may be melted and mixed with an additive component; or the EVOH (a) may be dissolved in a suitable solvent and then mixed with an additive component.

The method of dipping the EVOH (a) in a solution of an additive component in order to add the additive component to the EVOH (a) may be carried out as a batch operation or a continuous operation. The morphology of the EVOH so treated is not specifically defined. For example, the EVOH may be in the form of a powder, granules, spheres, or columnar pellets. The concentration of the additive component in the solution is also not specifically defined. The solvent for the solution is not also specifically defined, but water is a preferred solvent since aqueous solutions are easy to handle. The preferred range of the dipping time may vary, depending on the morphology of the EVOH treated. Preferably, for example, EVOH pellets having a size of from 1 to 10 mm or so will be dipped in the solution for at least 1 hour, more preferably for at least 2 hours.

The mode of dipping the EVOH in the solution of an additive component is not specifically defined. For example, the EVOH may be dipped in a plurality of different solutions separately containing any of the additive components, or may be dipped in one solution containing all of the additive components. In order to simplify the processing operation, the EVOH is preferably dipped in one solution containing all of the additive components. After dipping the EVOH in the additive solution in the manner described above, the EVOH is then dried. By means of this process, the treated EVOH contains at least one additive selected from a group consisting of carboxylic acids, alkali metal salts, alkaline earth metal salts and phosphate compounds.

Two or more different types of EVOH (a) that differ in any of the degree of polymerization, the ethylene content and/or the degree of saponification may be combined for use in the composition of the present invention. In addition, the EVOH (a) may also contain any other suitable additives such as a plasticizer, an antioxidant, a pigment, a UV absorbent, an antistatic agent, a crosslinking agent, a filler and/or reinforcing agent such as any of various fibers. In particular, when the EVOH composition of the present invention is used in a powder coating composition, it is desirable that the EVOH (a) contain at least one pigment. The pigment may be kneaded in a melt of the EVOH (a) before the EVOH (a) is ground; or the ground EVOH (a) may be subsequently dry-blended with pigment. The former method of kneading the pigment in a melt of the EVOH (a) before the EVOH (a) is ground is preferred in order to uniformly disperse the pigment in the EVOH. In order to enhance the dispersion of the additives in the EVOH (a), a dispersant of, for example, higher fatty acids may be added to the EVOH (a).

Any other thermoplastic resin other than EVOH may be added to the EVOH (a) in the composition of the present invention. The additional thermoplastic resin may include, for example, various polyolefins (e.g., polyethylene, polypropylene, poly-1-butene, poly-4-methyl-1-pentene, an ethylene-propylene copolymer, a copolymer of ethylene with an α-olefin having at least 4 carbon atoms, a copolymer of a polyolefin with maleic anhydride, an ethylene-vinyl ester copolymer, an ethylene-acrylate copolymer, and modified polyolefins prepared by graft-modifying any of these polymers with any of unsaturated carboxylic acids or their derivatives, various nylons (e.g., nylon-6, nylon-6,6, nylon-6/6,6 copolymer), polyvinyl chlorides, polyvinylidene chlorides, polyesters, polystyrenes, polyacrylonitriles, and modified polyvinyl alcohol resins.

The EVOH (a) of the present invention may contain a thermosetting resin. The thermosetting resin may include, for example, various epoxy resins, acrylic resins, urethane resins, polyester resins, and modifications thereof. One or more such thermosetting resins may be combined with a curing agent of, for example, amines, acid anhydrides, dibasic acids or blocked isocyanates, and may be added to the EVOH (a).

The EVOH resin prepared in the manner described above must be processed into the intended EVOH powder (A) having a particle size of from 22 to 850 μm, except if the EVOH resin is already a powder having a particle size of from 22 to 850 μm. The method of processing the EVOH is not specifically defined. For example, the EVOH may be cryogenically ground; it may be mechanically ground in a jet mill; or it may be dissolved in a mixed solvent of water/alcohol and then precipitated and deposited as fine particles in a poor solvent such as water or hexane.

The particle size of the EVOH powder (A) of the EVOH (a) having an ethylene content of from 2 to 60 mol % and a degree of saponification of higher than 95% of the present invention falls between 22 and 850 μm. Specifically, the EVOH powder (A) comprises at least 80% by weight of particles capable of passing through a standard sieve having a nominal size of 850 μm but not through a standard sieve having a nominal size of 22 μm, as stipulated in JIS Z-8801. The EVOH powder coating composition of the present invention, containing an EVOH powder (A) having a particle size range as described above, forms a good coating film of high uniformity (that is, a smooth and glossy coating film) on the shaped articles to which it has been applied. If the EVOH powder (A) comprises more than 20% by weight of particles that pass through the 22 μm sieve, the particles of EVOH (a) will readily aggregate together and the surface of the coating film will thereby be rougher. On the other hand, if the EVOH powder (A) comprises less than 80% by weight of particles that pass through the 850 μm sieve, the surface of the coating film formed therefrom will also be rougher. More preferably, the particle size of the EVOH powder (A) of the power coating composition of the present invention falls between 26 and 710 μm, more preferably between 32 and 600 μm, most preferably between 38 and 500 μm.

The inorganic particles (B) of the composition of the present invention have primary particles with a mean particle size of from 1 to 100 nm. In a fine inorganic powder, in general, the individual particles loosely aggregate together to form secondary particles. In the present invention, the mean particle size of the primary particles is defined as the particle size of the primary particles which form the secondly particles. Specifically, the mean particle size of the primary particles of (B) may be determined by averaging the measured diameter of the primary particles of (B), as determined by transmission electron microscopy.

Inorganic particles (B) having a mean particle size of less than 1 nm are difficult to produce. In addition, it is difficult to mix such particles with the EVOH powder (A) to give a homogeneous EVOH composition, and therefore such a composition does not provide a uniform coating film. On the other hand, if the inorganic particles (B) have a mean particle size which is greater than 100 nm, the coating film formed from such a composition also tends to be non-uniform.

The lowermost limit of the mean particle size of the inorganic particles (B) is preferably at least 3 nm, more preferably at least 5 nm, even more preferably at least 7 nm. On the other hand, the uppermost limit of the mean particle size of the inorganic particles (B) is preferably at most 85 nm, more preferably at most 70 nm, even more preferably at most 55 nm.

The types of the inorganic particles (B) suitable for the composition of the present invention are not specifically defined. For example, the inorganic particles (B) may be silica, aluminum oxide, talc, titanium oxide or calcium carbonate. Talc, titanium oxide and calcium carbonate are intrinsically colored, and therefore when these inorganic particles are used, the EVOH composition of the present invention cannot readily be colored with another pigment. When a transparent coating film is desired, it is preferable that the inorganic particles (B) of the powder coating composition of the present invention be transparent. Silica and aluminum oxide of high transparency are especially preferred as the inorganic particles (B) for transparent powder coating films.

The inorganic particles (B) of the present invention are preferably rendered hydrophobic on their surfaces. Inorganic particles (B) having a hydrophobic surface further enhances the advantages of the present invention, although the reason for this is not clear. Specifically, when the EVOH powder coating composition has inorganic particles (B) with a hydrophobic surface, the uniformity of the coating film formed is much improved compared to otherwise identical compositions in which the inorganic particles (B) have not been treated to have a hydrophobic surface. Any known method for rendering the surfaces of the inorganic particles (B) hydrophobic may be used. For example, the particles may be treated with halogenosilanes, alkoxysilanes or siloxanes.

The EVOH composition of the present invention may comprise 100 parts by weight of a powder (A) having a particle size of from 22 to 850 μm of an EVOH (a) which has an ethylene content of from 2 to 60 mol % and has a degree of saponification of higher than 95%, and from 0.0001 to 2 parts by weight of inorganic particles (B) of which the primary particles have a mean particle size of from 1 to 100 nm. In one preferred embodiment of the EVOH composition, the inorganic particles (B) adhere to the surface of the EVOH powder (A). If the amount of inorganic particles (B) is smaller than 0.0001 parts by weight relative to 100 parts by weight of the EVOH powder (A), the EVOH powder coating composition does not provide satisfactory uniformity in the coating film formed from it. On the other hand, if the amount of the inorganic particles (B) is larger than 2 parts by weight relative to 100 parts by weight of the EVOH powder (A), the EVOH powder coating composition also does not provide improved uniformity in the coating film formed from it. In addition, the interlayer adhesion between the coating film and the coated substrate significantly decreases. The lowermost limit of the amount of the inorganic particles (B) in the composition of the present invention is preferably at least 0.001 parts by weight, more preferably at least 0.005 parts by weight, most preferably at least 0.01 parts by weight relative to 100 parts by weight of the EVOH powder (A) in the composition. On the other hand, the uppermost limit of the amount of the inorganic particles (B) is preferably at most 1.5 parts by weight, more preferably at most 1 part by weight, even more preferably at most 0.7 parts by weight, most preferably at most 0.5 parts by weight relative to 100 parts by weight of the EVOH powder (A) in the composition of the present invention.

The method of producing the EVOH composition of the present invention is not specifically defined. Preferably, for example, the composition may be produced as described below. A powder (A) comprising an EVOH (a) having a particle size of from 22 to 850 μm, an ethylene content of from 2 to 60 mol %, and a degree of saponification of higher than 95%, may be dry-blended with inorganic particles (B) having primary particles with a mean particle size of from 1 to 100 nm. In a second method, pellets of the EVOH (a) may be dry-blended with the inorganic particles (B) and the resulting mixture ground. In a third method, the EVOH powder (A) and the inorganic particles (B) may be suspended in a liquid (e.g., water), fully stirred, then dewatered and dried. In a fourth method, a suspension of the inorganic particles (B) in a liquid (e.g., water) may be added to a dry EVOH powder (A) and stirred in. The inorganic particles (B) and EVOH powder (A) are well mixed and then dewatered and dried. The preferred methods are the methods of dry-blending the EVOH powder (A) with the inorganic particles (B), and dry-blending pellets of the EVOH (a) with the inorganic particles (B) followed by grinding the resulting mixture. These two methods are simple and have satisfactory productivity. The method of dry-blending the EVOH powder (A) with the inorganic particles (B) is especially preferred.

The methods of mixing the EVOH powder (A) with the inorganic particles (B) discussed above have the advantages discussed below, when compared to the different method of kneading (A) and (B) together in a melt, followed by grinding the resulting mixture. Specifically, in the former preferred methods, the inorganic particles (B) can be deposited predominantly on the surface of the EVOH powder (A) but not inside the EVOH particles. As a result, the uniformity of the resulting coating film formed is good, even when an extremely small amount of (B) is added to (A). That is, the composition prepared in a preferred manner produces better and more remarkable results.

The water content of the EVOH composition of the present invention is not specifically defined. In order to provide a coating film with good uniformity, it is desirable that the uppermost limit of the water content of the EVOH composition of the present invention is less than 6% by weight, more preferably at most 4% by weight, even more preferably at most 3% by weight, still more preferably at most 2.5% by weight. The uniformity of the coating film provided by the EVOH powder coating composition of the present invention is suitable even when the water content of the EVOH composition is 1% by weight or less. The uniformity of the coating film provided by the EVOH powder coating composition of the present invention is better than that provided by an EVOH composition having the EVOH (a) alone, but not the inorganic particles (B). Thus, the EVOH composition of the present invention may be dried so that there is essentially no water present. However, an EVOH composition of the present invention, having a water content of higher than 1% by weight, for example, having a lowermost water content of at least 1.1% by weight or even at least 1.2% by weight, is significantly better than any other conventional EVOH powders. Specifically, the advantage of an EVOH composition of the present invention, having a water content of higher than 1% by weight is that it can be directly used for powder coating compositions, and does not require any complicated drying treatment. Furthermore, the uniformity of a coating film formed therefrom is very good. Thus, the EVOH composition of the present invention is superior to conventional EVOH powder coating compositions.

The EVOH composition of the invention is suitable for powder coating compositions, and can be used in various powder coating methods. For example, the EVOH composition of the present invention may be used in fluidized bed coating methods, electrostatic coating methods, or flame spray coating methods. The coating temperature of the composition varies, depending on the coating method employed and on the melting point of EVOH used. In general, it may fall between approximately 150 and 300° C.

The substrate to which the EVOH powder coating composition of the present invention is applied is preferably metal, including, for example, steel tubes and steel sheets. When the EVOH powder coating composition of the invention is applied to such metallic substrates, the substrates may be optionally pre-treated. For example, they may be degreased, phosphorylated or plated for the purpose of improving the adhesion of the coating film, the corrosion resistance of the coating film, and the appearance of the coated substrates. The EVOH composition of the present invention is not limited to such metallic substrates, but may also be used for coating earthenware, ceramics, glass, plastics, etc.

The EVOH powder coating composition of the present invention may be applied in such a manner so as to provide substrates, typically metallic substrates, with a multi-layer structure. During the coating process, if desired, the substrate coated with coating (or multiple coatings) of the composition of the present invention, may be further layered with one or more additional resin layers in any desired manner. For example, the multi-layer structures having some additional resin layer may have the structure M/E/P1, M/P1/E and M/P1/E/P2, in which M indicates a substrate, E indicates a coating layer of the EVOH composition of the invention, and P1 and P2 are each an additional resin layer. However, the invention is not limited to these specific examples, but may also include other multilayered film structures comprising one or more layers of the EVOH composition of the present invention, and one or more layers of additional resins.

The additional resin that may be laminated with the coating layer of the EVOH composition of the present invention may include, for example, olefin homopolymers and copolymers such as various polyethylenes, polypropylenes, ethylene-vinyl acetate copolymers; carboxylic acid-modified polyolefins; polyesters and polyester elastomers such as polyethylene terephthalate; various polyamide resins such as nylon-11, nylon-12; other thermoplastic resins such as polyvinyl chlorides, polyvinylidene chlorides, acrylic resins, polyurethane elastomers; as well as thermosetting epoxy resins, thermosetting acrylic resins, thermosetting urethane resins, thermosetting polyester resins, and modified derivatives of those resins. Any of these resins may be laminated with the EVOH coating layer, either as individual layers, or combinations of layers of the various additional resins.

The method of combining the coating layer of the EVOH composition of the present invention with any other resin layer on a substrate is not specifically defined. For example, one substrate may be coated sequentially with the individual powder coating compositions, one after another; or a mixture of the EVOH composition of the invention with one or more other resins may be melted together, and subsequently phase separate in the resulting melt owing to the affinity difference between the different resin, and then applied to a substrate all at once to form two or more resin layers on the substrate. The former method of sequentially coating one substrate separately with the individual powder coating compositions, one after another, is preferred as it does not require any specific consideration for the affinity difference between the resins used.

The surfaces of the coated multi-layer structures are not roughened and their appearance is good. In addition, the adhesion of the coating layers to the substrate is good. Therefore, the coated multi-layer structures are suitable for use in water pipes for potable water, metallic baskets, tanks for chemicals, etc. The EVOH composition of the present invention is also suitable for use in molding processes employing resin powders, such as rotational molding and compression molding.

EXAMPLES

The present invention is described in more detail with reference to the following examples, which, however, are not intended to restrict the scope of the invention. Unless otherwise specifically indicated, "%" and "parts" in the following Examples are all by weight. The water used in the Examples is ion-exchanged water.

Synthesis Example 1

83.1 kg of vinyl acetate, 8.4 kg of methanol and 24.1 g of vinyltrimethoxysilane were fed into a 200-liter polymerization reactor, in which the oxygen was purged out with a stream of ethylene gas. The temperature in the reactor was controlled at 60° C., and ethylene gas was introduced into the reactor to increase the pressure inside the reactor up to 6.18 MPa. After the temperature and the pressure in the reactor were stabilized, a solution of 150 g of a polymerization initiator, azobisisovaleronitrile dissolved in 3 kg of methanol was introduced into the reactor to initiate the polymerization of the monomers. After 4 hours, the reactor was cooled to 20° C., while at the same time, a solution of 0.2 g of copper acetate dissolved in 20 kg of methanol was fed into the reactor to stop the polymerization. At the end of the polymerization, the conversion of vinyl acetate was 35%.

The ethylene gas was purged out of the reactor, and the polymer solution was removed from the reactor and diluted with 20 liters of methanol. The resulting polymer solution was fed into the top of a stripping column, while methanol vapor was fed through the bottom, whereby the non-reacted monomer still remaining in the polymer solution was evaporated away along with the methanol vapor, thereby providing a methanol solution of an ethylene-vinyl acetate copolymer. The ethylene content of the polymer was 47 mol %, and the polymer concentration in the polymer solution was 43%.

The methanol solution of the vinyltrimethoxysilane-modified ethylene-vinyl acetate copolymer thus obtained was fed into a saponification reactor, to which was added 0.4 equivalents, relative to amount of the vinyl ester groups in the copolymer, of a solution of sodium hydroxide/methanol (80 g/liter). Additional methanol was added to the mixture to provide a polymer mixture having a polymer concentration of 20%. The solution was heated to 60° C., and the polymer was saponified for about 4 hours, during which nitrogen gas was introduced into the reactor. After 4 hours, the resulting solution was neutralized with acetic acid to stop the reaction. The degree of saponification of the resulting vinyltrimethoxysilane-modified ethylene-vinyl alcohol copolymer (EVOH) was 99.4%.

The methanol solution of EVOH thus obtained was heated up to 80° C., and the excess methanol was evaporated away to provide a polymer solution with a polymer concentration of 43.3%. To 100 parts by weight of the resulting methanol solution of EVOH, was added 5.61 parts by weight of water to provide a methanol/water solution of a polymer having a polymer concentration of 41%. The methanol/water solvent ratio was 91/9 by weight. The aqueous methanol solution of EVOH was extruded out through circular orifices formed in a metal plate, into a coagulation bath of 10/90 by weight methanol/water at 5° C. to form EVOH strands. The resulting strands were cut into EVOH pellets each having a diameter of about 3 mm and a length of about 5 mm. The EVOH pellets were dewatered in a centrifuge, washed with a large quantity of water, then again dewatered. This operation was repeated several times.

100 parts by weight of the resulting wet EVOH pellets (water content of 55%, based on the weight of the wet EVOH pellets) were dipped in 845 parts by weight of an aqueous solution containing 0.4 g/liter of acetic acid, 0.28 g/liter of calcium acetate and 0.075 g/liter of potassium dihydrogenphosphate, at 25° C., for 6 hours. After dipping, the pellets were dewatered, and dried in a hot air drier at 80° C. for 3 hours, and then at 107° C. for 24 hours, thereby providing dry EVOH pellets. The carboxylic acid content, the phosphate compound content, and the metal ion content of the resulting dry EVOH pellets was then determined by the methods discussed below.

(1) Determination of Carboxylic Acid Content of EVOH:

20 g of a sample of the dry EVOH pellets was put into 100 ml of ion-exchanged water, and thermally extracted at 95° C. for 6 hours. The resulting extract was titrated to the neutralization point with 1/50 N NaOH, using phenolphthalein as an indicator. The number of moles of acid determined in this manner was multiplied by the molecular weight of the acid to calculate the acid content of the EVOH. In addition, the extract was analyzed by ion chromatography with an eluent of aqueous 0.1% phosphoric acid solution, in a Yokogawa Electric SCS5-252 column in order to identify the carboxyl anion of the acid.

(2) Determination of Alkali Metal Ion Content and Alkaline Earth Metal Ion Content of EVOH:

10 g of a sample of the dry EVOH pellets was placed in 50 ml of aqueous 0.01 N HCl solution, and stirred at 95° C. for 6 hours. The stirred aqueous solution was analyzed by ion chromatography to quantify the metal ion concentration using a Yokogawa Electric ICS-C25 column, using an aqueous solution containing 5.0 mM tartaric acid and 1.0 mM 2,6-pyridinedicarboxylic acid as an eluent. The metal ion concentration was calculated from calibration curves, which were obtained by analyzing standard aqueous solutions of various metal salts, such as aqueous sodium chloride solutions, aqueous potassium chloride solutions, aqueous magnesium chloride solutions and aqueous calcium chloride solutions. Based on the amount of alkali metal ions and alkaline earth metal ions measured by this method in the sample, the amount of the alkali metal salt and the alkaline earth metal salt in the dry pellets was calculated.

(3) Determination of Phosphate Compound in EVOH:

10 g of a sample of the dry EVOH pellets was put into 50 ml of aqueous 0.01 N HCl solution, and stirred at 95° C. for 6 hours. The stirred aqueous solution was analyzed by ion chromatography in order to quantify the amount of phosphate ion, using a Yokogawa Electric ICS-A23 column, and using an aqueous solution containing 2.5 mM sodium carbonate and 1.0 mM sodium hydrogencarbonate as an eluent. The amount of phosphate ion was calculated based on a calibration curve derived from the analysis of standard aqueous sodium dihydrogenphosphate solutions. The amount of phosphate compound, expressed as the weight of phosphate groups in the dry pellets, was calculated from the amount of phosphate ions measured in the sample.

The carboxylic acid in the dry EVOH pellets was acetic acid, and the acid content of the pellets was 320 ppm. The calcium salt content of the EVOH pellets was 75 ppm (as $Ca^{2+}$); the potassium salt content was 35 ppm (as $K^+$); and the phosphate compound content was 50 ppm (as the total amount of $PO_4^{3-}$, $HPO_4^{2-}$, and $H_2PO_4^-$). The MFR of the EVOH resin pellets, measured at 190° C. under a load of 2160 g, was 10 g/10 min. The ratio by weight of the carboxylic acid to the alkali metal salt (i.e., the weight of the carboxylic acid divided by the weight of the alkali metal) in the EVOH was 9.1. The ratio by weight of the carboxylic acid to the alkaline earth metal salt (i.e., the weight of the carboxylic acid divided by the weight of the alkaline earth metal) in the EVOH was 4.3.

The degree of modification of the EVOH with the silicon-containing olefinic unsaturated monomer and the intrinsic viscosity of the modified EVOH were measured according to the methods discussed below.

(4) Determination of Degree of Modification of EVOH with Silicon-Containing Olefinic Unsaturated Monomer:

10 g of a sample of the dry EVOH pellets was put into a platinum crucible, to which was added a 1/1 mixture of concentrated sulfuric acid/concentrated nitric acid. The crucible was then heated and the sample was thereby carbonized. The carbonized sample was ashed in an electric furnace at 600° C., and then melted in sodium carbonate at 900° C. After cooling to room temperature, distilled water was added thereto to provide an aqueous solution having a volume of 50 ml. The silicon content of the aqueous solution was measured by atomic absorption spectrometry under the condition discussed below, from which was calculated the degree of modification (Y) of the EVOH with the silicon-containing olefinic unsaturated monomer.

Device: Perkin-Elmer Model 2380,
Measurement Wavelength: 251.6 nm,
Slit Width: 0.2 nm,
Lamp: Perkin-Elmer #303-6063,
Lamp current: 40 mA,
Frame: Acetylene-nitrous oxide frame.

(5) Intrinsic Viscosity of EVOH:

0.20 g of a sample of the dry EVOH pellets was dissolved in 40 ml of aqueous phenol (water/phenol=15/85% by weight) and heated at 60° C. for 3 to 4 hours. The viscosity of the resulting solution was measured at 30° C. with an Ostwald viscometer ($t_0$=90 seconds). The intrinsic viscosity [η] of EVOH was calculated using the equation below.

$$[\eta]=(2(\eta_{sp}-1\eta_{rel}))^{1/2}/C(\text{liter/g})$$

in which;

$\eta_{sp}$=t/$t_0$−1 (specific viscosity),
$\eta_{rel}$=t/$t_0$ (relative viscosity),
C is the EVOH concentration in the sample (g/l),
$t_0$ is the time taken by the blank (aqueous phenol) to pass through the viscometer,
t indicates the time taken by the sample-containing aqueous phenol solution to pass through the viscometer.

The vinyltrimethoxysilane content of the EVOH was 0.01 mol %, and the intrinsic viscosity [η] was 0.0856 liter/g.

Synthesis Example 2

EVOH having an ethylene content of 47 mol %, a degree of saponification of 99.4%, and a degree of modification with a silicon-containing olefinic unsaturated monomer of 0 mol % was obtained in the same manner as in Synthesis Example 1, except that vinyltrimethoxysilane was not added to the polymerization reaction. The acetic acid content of the resulting EVOH obtained was 320 ppm; the calcium salt content was 75 ppm; the potassium salt content was 35 ppm; and the phosphate compound content was 50 ppm. The MFR of the EVOH, measured at 190° C. under a load of 2160 g, was 16 g/10 min. The ratio by weight of the carboxylic acid to the alkali metal salt in the EVOH was 9.1. The ratio by weight of the carboxylic acid to the alkaline earth metal salt was 4.3.

Synthesis Example 3

100 parts by weight of wet pellets (water content of 55%, based on the weight of the wet pellets) of EVOH (a) having an ethylene content of 47 mol %, a degree of saponification of 99.6%, and a degree of modification with a silicon-containing olefinic unsaturated monomer of 0 mol %, were dipped in 845 parts by weight of an aqueous solution containing 0.25 g/liter of acetic acid and 0.483 g/liter of sodium acetate, at 25° C. for 6 hours. After dipping, the pellets were dewatered, and dried in a hot air drier at 80° C. for 3 hours and then at 107° C. for 24 hours to provide dry pellets of EVOH (a). The acetic acid content of the EVOH was 150 ppm, and the sodium salt content was 150 ppm. The MFR of the EVOH, measured at 190° C. under a load of 2160 g, was 46 g/10 min. The ratio by weight of the carboxylic acid to the alkali metal salt in the EVOH was 1.

Example 1

The dry EVOH pellets obtained in Synthesis Example 1 were used to prepare the EVOH (a). Specifically, the dry pellets of Synthesis Example 1 were cooled with liquid nitrogen and milled in a grinder to obtain an EVOH powder (A) having a particle size of from 45 to 425 μm of EVOH (a). (Thus, the EVOH powder (A) had at least 80% by weight of particles of EVOH (a) that had passed through a JIS standard sieve having a nominal size of 425 μm but not through a JIS standard sieve having a nominal size of 45 μm.) To 100 parts of the EVOH powder (A), added were 0.1 parts of inorganic particles (B), Nippon Aerosil AEROSIL R972 (a silica powder having a mean particle size of the primary particles of 16 nm, and surface treated with a dimethylsilyl compound), and shaken well to provide an ethylene-vinyl alcohol copolymer composition comprising a mixture of (A) and (B). The water content of the EVOH powder was 1.4%, measured according to the method discussed below.

(6) Determination of Water Content of EVOH Composition:

Using a Mettler HR73—HALOGEN water content meter, about 2 g of a sample of the EVOH composition was dried at 180° C. for 20 minutes to determine the water content (X) of the EVOH composition.

Next, the surface of an iron plate of dimensions 0.8 mm thick×50 mm×100 mm was degreased by washing it with detergent. The iron plate was coated with the EVOH powder composition produced as described above, using a fluidized bed coating method. Specifically, the fluidized bed coating method comprises fluidizing the EVOH composition powder in a fluidizing room by introducing air through a multi-holed plate and suspending the iron plate substrate in the fluidized layer of the powder in the room, thereby coating the substrate with the powder. The fluidized bed coating conditions are discussed below.

Substrate pre-heating: 280° C. for 10 minutes,
Dipping time: 5 seconds,
Post-heating: at 200° C. for 5 minutes.

The iron plate thus coated with the EVOH powder was evaluated for the uniformity of the coating film, the smoothness and the glossiness of the coating film, using the criteria discussed below. In addition, the degree of yellowing of the coating film and the adhesion of the coating film to the substrate were measured by the methods discussed below.

(7) Smoothness of Coating Film:

The smoothness of the coating film formed on the substrate was visually evaluated according to the criteria below.

Rank: Condition
A (good): The coating film is smooth and good.
B (good): The coating film slightly roughened, but is of commercially acceptable quality.
C (not good): The coating film exhibited significant roughening, and is not of commercially acceptable quality.

(8) Glossiness of Coating Film:

The glossiness of the coating film formed on the substrate was visually evaluated according to the criteria below:

Rank: Condition
A (good): The coating film is glossy and beautiful.
B (good): The coating film is not so glossy, but is of commercially acceptable quality.
C (not good): The coating film is not glossy at all, (i.e., has the appearance of a frosted film), and is not of commercially acceptable quality.

(9) Degree of Yellowing of Coating Film:

The color of the coating film formed on the substrate was visually evaluated according to the criteria below.

Rank: Condition
A (good): The coating film is slightly yellowed.
B (good): The coating film is slightly yellowed, but is of commercially acceptable quality.
C (not good): The coating film is significantly yellowed, and does not have a commercially acceptable appearance.

(10) Adhesion of the Coating Film to the Substrate:

Using a knife, the EVOH coating film formed on the substrate was partly cut, and then the coating was peeled from the substrate. The adhesion of the coating film to the substrate was evaluated according to the criteria below.

Rank: Condition
A (good): The coating film is difficult to peel off, and is firmly adhered to the substrate.
B (good): When pulled slowly from the substrate, the coating film peels off without tearing.
C (not good): The coating film is readily peeled off from the substrate.

Based on the criteria mentioned above, the iron plate coated with the EVOH powder in this Example (i.e., Example 1) was evaluated in regard to the uniformity of the coating film (the smoothness and the glossiness of the coating film), the degree of yellowing of the coating film, and the adhesion of the coating film to the substrate. The iron plate coated with the EVOH powder in this Example ranked A in regard to the smoothness of the coating film, the glossiness of the coating film, the degree of yellowing of the coating film and the adhesion of the coating film to the substrate, and ranked B in regard to the glossiness of the coating film. The results are summarized in Table 1.

Example 2

An EVOH composition comprising EVOH powder (A) and inorganic particles (B) was produced in the same manner as in Example 1, except that the EVOH prepared in Synthesis Example 2 was used as EVOH (a). An iron plate was coated with the EVOH powder composition using a fluidized bed coating method, in the same manner as in Example 1, and the coated plate was evaluated in regard to the uniformity of the coating film (the smoothness and the glossiness of the coating film), the degree of yellowing of the coating film, and the adhesion of the coating film to the substrate. The test results are summarized in Table 1.

Example 3

An EVOH composition comprising EVOH powder (A) and inorganic particles (B) was produced in the same manner as in Example 2, except that Nippon Aerosil AEROSIL R974 (a silica powder having a mean particle size of 12 nm, and surface treated with a dimethylsilyl compound) was used as the inorganic particles (B). Also, an iron plate was coated with the EVOH powder composition using the fluidized bed coating method of Example 2. The coated plate was evaluated in regard to the uniformity of the coating film (the smoothness and the glossiness of the coating film), the degree of yellowing of the coating film, and the adhesion of the coating film to the substrate. The test results are summarized in Table 1.

Example 4

An EVOH composition comprising EVOH powder (A) and inorganic particles (B) was prepared in the same manner as in Example 2, except that Nippon Aerosil AEROSIL RX200 (a silica powder having a mean particle size of 12 nm, and surface treated with a trimethylsilyl compound) was used as the inorganic particles (B). Also, an iron plate was coated with the EVOH powder composition by the fluidized bed coating method of Example 2. The coated plate was evaluated in regard to the uniformity of the coating film (the smoothness and the glossiness of the coating film), the degree of yellowing of the coating film, and the adhesion of the coating film to the substrate. The test results are summarized in Table 1.

Example 5

An EVOH composition comprising EVOH powder (A) and inorganic particles (B) was prepared in the same manner as in Example 2, except that Nippon Aerosil AEROSIL 200CF (a silica powder having a mean particle size of 12 nm, but not surface treated) was used as the inorganic particles (B). In the same manner as in Example 2, an iron plate was coated with the EVOH powder composition by a fluidized bed coating method, and the coated plate was evaluated in regard to the uniformity of the coating film (the smoothness and the glossiness of the coating film), the degree of yellowing of the coating film, and the adhesion of the coating film to the substrate. The test results are summarized in Table 1.

Example 6

An EVOH composition comprising EVOH powder (A) and inorganic particles (B) was prepared in the same manner as in Example 2, except that the EVOH (a) of Synthesis Example 3 was used. Also, in the same manner as in Example 2, an iron plate was coated with the EVOH powder composition by a fluidized bed coating method, and the coated plate was evaluated in regard to the uniformity of the coating film (the smoothness and the glossiness of the coating film), the degree of yellowing of the coating film, and the adhesion of the coating film to the substrate. The test results are summarized in Table 1.

Comparative Example 1

A powder coating resin was produced in the same manner as in Example 2, except that no inorganic particles (B) were added. The composition instead comprised only an EVOH (a) having a particle size of from 45 to 425 μm. Also, in the same manner as in Example 2, an iron plate was coated with the powder coating resin by a fluidized bed coating method, and the coated plate was evaluated in regard to the uniformity of the coating film (the smoothness and the glossiness of the coating film), the degree of yellowing of the coating film, and the adhesion of the coating film to the substrate. The test results are summarized in Table 1.

Comparative Example 2

An EVOH composition comprising EVOH powder (A) and inorganic particles (B) was produced in the same manner as in Example 2, except that the amount of the inorganic particles (B) was 5 parts by weight relative to 100 parts by weight of the EVOH powder (A). Also, in the same manner as in Example 2, an iron plate was coated with the EVOH powder composition by a fluidized bed coating method, and the coated plate was evaluated in regard to the uniformity of the coating film (the smoothness and the glossiness of the coating film), the degree of yellowing of the coating film, and the adhesion of the coating film to the substrate. The test results are summarized in Table 1.

TABLE 1

|  | Water Content of Powder of EVOH Composition (wt. %) | Smoothness of Coating Film | Glossiness of Coating Film | Degree of Yellowing of Coating Film | Adhesiveness of Coating Film to Substrate |
| --- | --- | --- | --- | --- | --- |
| Example 1 | 1.4 | A | B | A | A |
| Example 2 | 1.5 | A | B | A | B |
| Example 3 | 1.3 | A | B | A | B |
| Example 4 | 1.5 | A | B | A | B |
| Example 5 | 1.3 | B | B | A | B |
| Example 6 | 1.6 | A | A | A | B |
| Comp. Example 1 | 1.4 | C | C | A | A |
| Comp. Example 2 | 1.6 | C | C | A | C |

Even though the water contents of the compositions of Table 1 are higher than 1% by weight, the EVOH powder coating compositions of Examples 1 to 6 of the present invention all formed good coating films of high uniformity (that is, the coating films formed were all smooth and glossy), when applied to substrates as a powder coating. In particular, the coating film formed of the EVOH composition of Example 1, in which the EVOH (a) was modified with a silicon-containing olefinic unsaturated monomer to a degree of modification of 0.01 mol %, had very good adhesion to the substrate.

In contrast, the coating film formed from the powder coating resin of Comparative Example 1, which did not contain any inorganic particles (B), did not have good properties. Though the water content of the powder coating resin of Comparative Example 1 was almost the same as that of the EVOH composition of Example 2, the coating film formed only from the powder coating resin comprising EVOH (a) alone, was not uniform, glossy, and had a poor appearance.

The coating film formed from the EVOH composition of Comparative Example 2, in which the amount of the inorganic particles (B) is greater than 2 parts by weight relative to 100 parts by weight of the EVOH powder (A), also was not uniform and glossy, and its appearance was not good.

As discussed above, the EVOH powder coating composition of the present invention forms a coating film having good uniformity on substrates to which it has been applied. In particular, not only dry but also wet EVOH powder compositions of the present invention, having a water content of more than 1% by weight, provide a coating film having good uniformity. Thus, the composition of the present invention has superior properties compared to conventional powder coating resin compositions.

The priority document of the present application, Japanese application 2001-265944, filed Sep. 3, 2001, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A composition comprising:
   100 parts by weight of a powder (A) having a particle size of 22 to 850 μm, and
   0.0001 to 2 parts by weight of inorganic particles (B) having primary particles with a mean particle size of from 1 to 100 nm,
   wherein powder (A) comprises an ethylene-vinyl alcohol copolymer (a) having an ethylene content of from 2 to 60 mol %, and a degree of saponification of more than 95%,
   the inorganic particles (B) adhere to the surface of the powder (A), and
   a water content of the composition is greater than 1% and lower than 6% by weight.

2. The composition of claim 1, wherein the ethylene-vinyl alcohol copolymer (a) has an amount of carboxylic acid ranging from 10 to 5000 ppm, based on the weight of the ethylene-vinyl alcohol copolymer (a).

3. The composition of claim 2, wherein the carboxylic acid is at least one carboxylic acid selected from the group consisting of acetic acid, propionic acid and lactic acid.

4. The composition of claim 1, wherein the ethylene-vinyl alcohol copolymer (a) has an amount of an alkali metal salt ranging from 5 to 500 ppm (expressed as ppm by weight of the elemental alkali metal in the ethylene-vinyl alcohol copolymer (a)).

5. The composition of claim 1, wherein the ethylene-vinyl alcohol copolymer (a) has an amount of a carboxylic acid ranging from 10 to 5000 ppm (based on the weight of the ethylene-vinyl alcohol copolymer (a)) and an amount of an alkali metal salt ranging from 5 to 500 ppm (expressed as ppm by weight of the elemental alkali metal in the ethylene-vinyl alcohol copolymer (a)), and a ratio by weight of the carboxylic acid to the alkali metal salt ranges from 0.1 to 15.

6. The composition of claim 1, wherein the ethylene-vinyl alcohol copolymer (a) has an amount of an alkaline earth metal salt ranging from 5 to 250 ppm (expressed as ppm by weight of the elemental alkaline earth metal in the ethylene-vinyl alcohol copolymer (a)).

7. The composition of claim 1, wherein the ethylene-vinyl alcohol copolymer (a) has an amount of a carboxylic acid ranging from 10 to 5000 ppm (based on the weight of the ethylene-vinyl alcohol copolymer (a)) and an amount of an alkaline earth metal salt ranging from 5 to 250 ppm (expressed as ppm by weight of the elemental alkaline earth metal in the ethylene-vinyl alcohol copolymer (a)), and a ratio by weight of the carboxylic acid to the alkaline earth metal salt ranges from 0.2 to 15.

8. The composition of claim 1, wherein the ethylene-vinyl alcohol copolymer (a) has an amount of a phosphate compound ranging from 1 to 300 ppm (expressed as ppm by weight of the total amount of phosphate groups in the ethylene-vinyl alcohol copolymer (a)).

9. The composition of claim 1, wherein the ethylene-vinyl alcohol copolymer (a) is modified with a silicon-containing olefinic unsaturated monomer, and the degree of modification of the copolymer with the monomer ranges from 0.0002 and 0.5 mol % (based on the moles of the monomer from which the ethylene-vinyl alcohol copolymer (a) was prepared).

10. The composition of claim 1, wherein the inorganic particles (B) are silica and/or aluminum oxide.

11. The composition of claim 1, wherein the inorganic particles (B) have a 25 hydrophobic surface.

12. A powder coating composition comprising the composition of claim 1.

13. The composition of claim 1, further comprising a thermoplastic resin other than EVOH.

14. The composition of claim 1, further comprising at least one additive selected from the group consisting of a plasticizer, an antioxidant, a pigment, an UV absorbent, an antistatic agent, a crosslinking agent, a filler, and a reinforcing agent.

15. The composition of claim 1, further comprising a thermosetting resin.

16. A method for preparing the composition of claim 1 comprising:
   dry-blending 100 parts by weight of a powder (A) having a particle size of 22 to 850 μm, and 0.0001 to 2 parts by weight of inorganic particles (B) having primary particles with a mean particle size of from 1 to 100 nm,
   wherein the powder (A) comprises an ethylene-vinyl alcohol copolymer (a) having an ethylene content of from 2 to 60 mol %, and a degree of saponification of more than 95%.

17. A method for preparing the composition of claim 1 comprising:
   dry-blending 100 parts by weight of an ethylene-vinyl alcohol copolymer (a) having an ethylene content of from 2 to 60 mol %, and a degree of saponification of more than 95%, and 0.0001 to 2 parts by weight of inorganic particles (B) having primary particles with a mean particle size of from 1 to 100 nm, and
   grinding the dry-blended ethylene-vinyl alcohol copolymer (a) and the inorganic particles (B).

* * * * *